Dec. 6, 1927.

F. J. DE LEWSKY 1,651,447

ELECTRICAL COIL AND MOUNTING

Filed April 3, 1925    2 Sheets-Sheet 1

Inventor
F. J. DeLewsky
By
Clarence O'Brian
Attorney

Dec. 6, 1927.
F. J. DE LEWSKY
1,651,447
ELECTRICAL COIL AND MOUNTING
Filed April 3, 1925 2 Sheets-Sheet 2
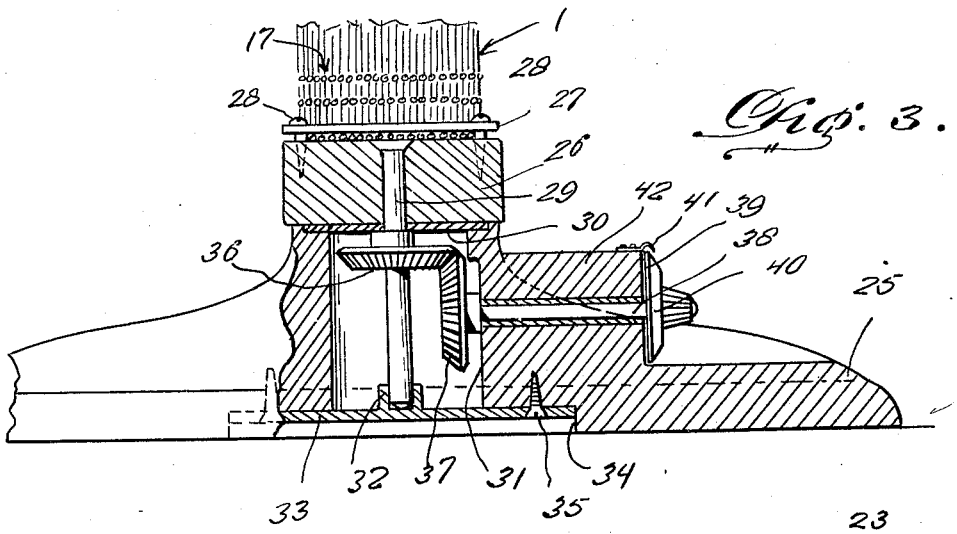
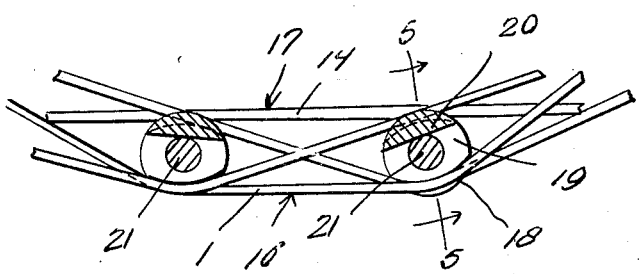
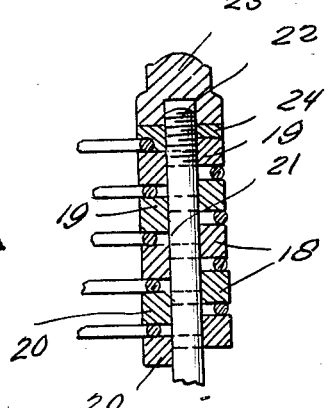
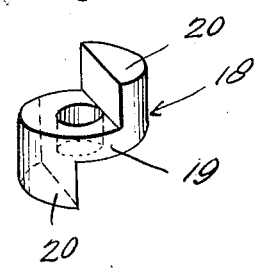
Inventor
F. J. DeLewsky,
By
Attorney Patented Dec. 6, 1927.

1,651,447

UNITED STATES PATENT OFFICE.

FRANK JOSEPH DE LEWSKY, OF DETROIT, MICHIGAN, ASSIGNOR OF ONE-HALF TO RICHARD J. WEYHING, OF DETROIT, MICHIGAN.

ELECTRICAL COIL AND MOUNTING.

Application filed April 3, 1925. Serial No. 20,448.

This invention relates to an electrical coil and mounting therefor, and particularly to an inductance coil structure of a self supporting character, adapted to be used as an inductance, in connection with radio receiving sets, and particularly for the purpose of construction of a loop antenna.

An object of the invention resides in providing a coil formed of a plurality of adjacent convolutions, of substantially uniform size, wound from a single piece of wire, adapted to form a rigid self supporting structure, while at the same time forming a highly efficient inductance.

Another object of the invention is to provide an inductance winding, formed of a single length of wire wound to provide a plurality of convolutions of polygonal form, having short and long sides forming irregular polygons, in which adjacent convolutions are rotated to place the short and long sides in relative angular relation, whereby a highly inductive winding is provided, particularly adaptable for forming a self-supporting loop antenna, in addition to which a simple and convenient mounting may be provided for operating the antenna, so that it may be rotated on one of its diameters for tuning cooperation with a radio receiving set.

A still further object of the invention resides in providing an electrical inductance coil of the character above mentioned having the convolutions secured in adjacent spaced relation by a special securing and spacing structure, adapted to engage each convolution of the coil at a predetermined point.

The invention also comprehends other objects and improvements in the details of construction and arrangement of the parts which are more particularly pointed out in the following detailed description and in the claims directed to the preferred form of the invention, it being understood, however, that various changes may be made in the size, shape, and arrangement of the coils, for adapting the windings to different desired uses, as an inductance, without departing from the spirit or scope of the invention as set forth therein.

In the drawings, forming a part of this application:

Figure 3 is an enlarged detail sectional view through the base, showing parts in elevation, and the manner of mounting the coils thereon.

Figure 4 is an enlarged detail sectional view, through the portion of the coil secured to the base, in a plane at right angles to the axis of the windings.

Figure 5 is a sectional view, taken on the line 5—5 of Figure 4.

Figure 6 is an enlarged detail perspective view of one of the spacing members for the convolutions of the coils.

Figure 1:
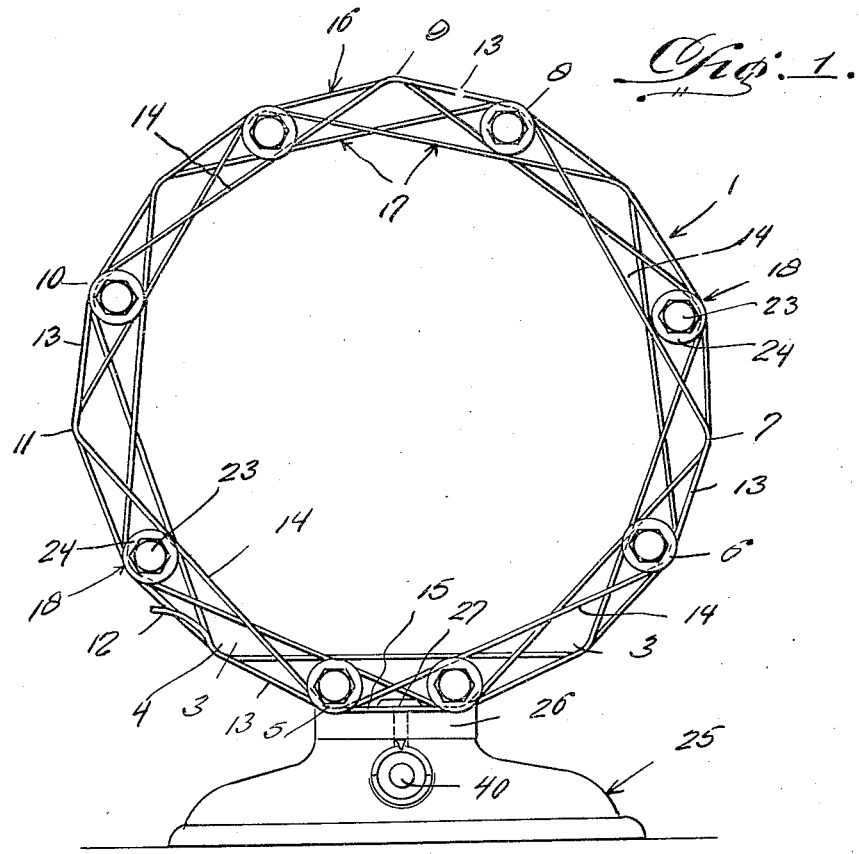
Figure 1 is a side elevational view of the improved coil construction forming the subject of this invention, with the mounting devices therefor.
Figure 2:
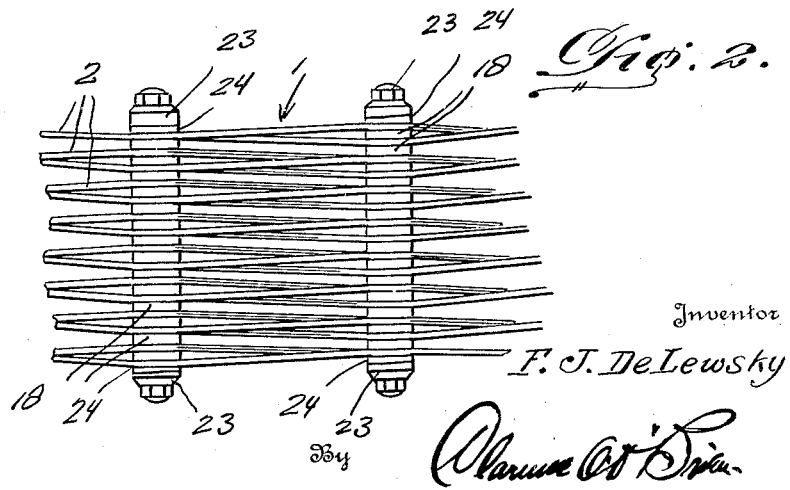
Figure 2 is a bottom plan view of the section of the coil secured to the base shown in Figure 1, showing on an enlarged scale, the manner in which the convolutions are spaced, so as to produce an air gap of uniform character, between all portions of all convolutions in the coil.

The inductance coil forming the subject matter of this invention is indicated generally by the numeral 1 in Figure 1, which is constructed from a self supporting coil structure, in the predetermined manner hereinafter described. The coil is formed of a substantially helical winding, in which each convolution as indicated at 2 in Figure 2 is arranged in spaced relation, and is formed in the shape of an irregular polygon. The polygonal figure formed by the completed coil is substantially different from the polygonal figure formed by the individual convolutions forming the coil, although the apices of the figures formed by the convolutions of the finished coil are common. The apices of the polygonal figure formed by the completed coil are indicated by the numeral 3, there being in the illustration shown in the drawing, fifteen apices, forming a fifteen sided polygon. Each pair of convolutions of the coil, in the present construction is formed to provide an irregular polygonal figure, having a plurality of short sides and long sides constructed to form a polygon having nine apices. The nine apices of the first coil of the winding shown in Figure 1, are indicated by the numerals 4, 5, 6, 7, 8, 9, 10, and 11, the end of the wire 12, being wound so that the same progresses from one apex to the next, in the order named. It will thus be seen that one convolution of the winding forms a polygonal figure having short sides at 13, intermediate which are the long sides 14, particular reference being had to the coil constructed upon the apices above mentioned. The long side of the end of the convolution illustrated in Figure 1, to which particular reference has been made, does not terminate at the apex indicated by the numeral 4, but due to the uneven number of apices terminates with the apex numbered 5, where it joins with the short side 15, in continuing into the next convolution forming the coil, which has the respective apices and sides thereof rotated with respect to the preceding coil, so that the sides of successive coils are positioned in angular relation. By this construction, a coil is produced having a uniform polygonal exterior configuration, as indicated by the numeral 16, as well as a uniform polygonal interior configuration, as indicated by the numeral 17, in Figure 1 of the drawings. It will be noted, in this respect that the inner and outer polygonal Figures 17 and 16 respectively are in uniform concentric relation, while the intermediate portions of the several convolutions of the coil extend in diagonal relation between the apices of the outer and inner polygon and form stress reducing sections for the remaining portions of the coil convolutions indicated at 16′ for cooperation to produce a rigid self-retaining structure. This cooperative self-retaining feature is acquired with the addition of suitable securing means, which will now be described.

Suitable spacing members are indicated at 18, which are formed by providing perforated disc members 19, which have projections 20 extending from opposite sides of the disc 19 at diametrically opposite points thereof. A plurality of these spacing members constructed, as above described, and shown particularly in Figure 6 of the drawing, are assembled in similar relation, as illustrated in Figure 5, at the apices of the outer and inner polygon figures formed by the convolutions of the coils, indicated by numerals 16 and 17, and are of such a size that the projections 20 of each spacing member are adapted to project between adjacent convolutions of the coil, in the manner as illustrated in Figure 5, at such apices. These spacing members, it will be seen, are in aligned relation, so that a rod member 21 may be inserted through the perforations of each disc portion. The ends of the rods are threaded, as indicated at 22, receiving a nut 23, adapted for threaded cooperation therewith for securing the spacing members 18 in binding relation for rigidly retaining the coiled convolutions 6 in spaced relation. A washer 24 is interposed between the end spacing member 18 and the nut 23 as illustrated in Figure 5, for engagement with the end convolutions. These rods 21 with their aligned spacing members, it will be noted, from an inspection of Figure 1, are arranged parallel to the axis of the coil, and in concentric circumferential relation thereto. The securing means thus formed for the coil convolutions may be placed at each apex of the polygonal structure which is of regular form, as indicated in Figure 1, and it has been found unnecessary in the majority of instances to use a securing means at each apex. The structure as illustrated has the securing means positioned at alternate apices, throughout the major portion of the coil, with a pair of the securing means positioned at adjacent apices of the polygon at the bottom portion of the coil.

In this secured relation of the coil convolutions, it will be seen that a rigid connection is made longitudinally between the outer and inner polygons, at the apices thereof, for the coil convolutions, so that each short side portion of a polygonal convolution is secured, by one of the securing means, while each long side portion of each convolution is secured at two points by other parts of the securing means, when positioned at alternate apices of the regular polygonal structure formed by the completed coil, as indicated by the numeral 16. That is, when the coil is constructed as illustrated in Fig. 1 of the drawings with the securing elements at alternate apices of the outer polygonal formation as illustrated, one of these securing means will engage a long side at one of the apices and at the end portion of the long side while the next adjacent securing means will engage the same long side near but spaced from the opposite end thereof. This shows the reason for the elimination of securing means at intermediate apices, while at the same time, the rigid self sustaining structure is produced by reason of the cooperation of the long sides extending between adjacent securing means, in which portions extend between the outer and inner regular polygons 16 and 17 and form stress distributing members for the coil structures which cooperates to produce a rigid polygonal completed coil. It will be noted that the long sides 14 of one convolution of the coil are parallel to the short side 13 of other convolutions of the coil, in the completed coil structure as indicated in Figure 1.

From this construction, it will be seen that an inductance coil of exceedingly low internal loss is provided, having at the same time maximum inductive efficiency.

It is to be understood that if desired, the coil structure may be formed as above described, with any desired polygonal shape, adaptable for predetermined uses, and which is especially adaptable to form a self supporting loop antenna structure, for which suitable base structure has been designed. A base mounting for this coil structure to form a loop antenna in which the coil structure is wound of a suitable size for the purpose, is indicated at 25 on which is rotatably mounted a cylindrical block 26, to which one side of the outer polygon 16 is secured, by means of the bar member 27, having suitable screws 28 or other securing means extending through the opposite ends thereof for clamping the bar member 27 in rigid relation on the block 26, with the portions of the wire forming the outer side of the outer polygon 16 clamped therebetween.

As loop antennæ have directional characteristics, it is necessary to mount the same for rotation on a vertical axis, and in the present instance, the coil structure is mounted for rotation on a diameter of the coil structure, extending in vertical relation to block 26, through the axis of the coil. For rotatably mounting the block 26 on the base 25, a shaft 29 suitably anchored in the block 26 extends through a bearing plate 30, mounted on the upper portion of the base 25, serving as a bearing for the block 26 as well as the shaft 29, while the opposite end of the shaft extends through the opening 21 in the base and is received in the stepped bearing 32 carried by the plate 33, secured in the recess 34 of the base 25, by suitable screws or other securing means, indicated at 35. A bevelled gear is mounted on the shaft 29 within the opening 31, indicated at 36, in Figure 3, which is in mesh with the bevelled gear 37 carried by the horizontal shaft 38 rotatably mounted in the bushing 39 extending horizontally through the base portion 25, and providing a convenient operating shaft for rotating the block 26 on the base. The outer end of the shaft 38 is provided with an operating dial 40, with which cooperates a suitable indicator 41, carried by the shoulder 42 on the base member in the rear of the dial 40, so that the position of rotation of the block 26 relative to the base member may be ascertained for recording stations in conjunction with a radio receiving set, with the base in a predetermined position.

From the above description, it will be seen that a self supporting coil structure has been provided, which is adapted for the making of self sustaining inductance coils, adapted for use in radio sets or of substantially larger inductance coils adapted to form loop antennæ, in which special cooperation is obtained between the wire forming the coil, and securing means therefor, in the formation of a rigid coil structure.

What is claimed is:

1. A self-sustaining electrical coil structure comprising a single wire formed into a plurality of convolutions, each convolution being formed to represent an irregular polygon of predetermined form, the convolutions of said coil all cooperating to form a pair of polygonal figures of regular and symmetrical form arranged in concentric relation, portions of the convolutions being inter-threaded in angular relation between the apices of the symmetrical polygons, and independent securing elements detachably mounted on the convolutions of said coil at predetermined apices of the symmetrical polygon structure formed by the coil, for securing said convolutions in rigid spaced relation, said securing elements cooperating with the coil convolutions to provide a self-supporting coil with an air core, the coil being the only support for said securing elements.

2. A self-sustaining electrical coil structure comprising a single wire formed into a plurality of convolutions, each convolution being formed to represent an irregular polygon of predetermined form, the convolutions of said coil all cooperating to form a pair of polygonal figures of regular and symmetrical form arranged in concentric relation, portions of the convolutions being inter-threaded in angular relation between the apices of the symmetrical polygons, and independent securing means mounted on the convolutions of said coil and predetermined apices of the symmetrical polygon structure formed by the coil, for securing said convolutions in rigid spaced relation, said securing means cooperating with the inter-threaded portions of the convolutions of said coil to produce a cooperative stress reducing means for maintaining the coil in predetermined form said coil being the only support for said securing means.

3. A self-sustaining electrical coil structure comprising a single wire formed into a plurality of convolutions, each convolution being formed to represent an irregular polygon of predetermined form, the convolutions of said coil all cooperating to form a pair of polygonal figures of regular and symmetrical form arranged in concentric relation, portions of the convolutions being inter-threaded in angular relation between the apices of the symmetrical polygons, and independent securing means mounted on the convolutions of said coil at predetermined apices of the symmetrical polygon structure formed by the coil, for securing said convolutions in rigid spaced relation, said securing means comprising a plurality of duplicate spacing members and securing means adapted to compress said members into binding relation with the convolutions of said coil at the outer and inner apices of the symmetrical polygons formed thereby, providing a rigid coil structure.

4. Securing and spacing means for self supporting electrical coils, comprising a plurality of spacing members formed of perforated plates having lateral projections thereon at opposite sides of the perforations, and rod members adapted to extend through the perforations in the plates having means thereon for securing said rod members and plates in assembled relation.

5. In combination, an electrical coil formed of a plurality of convolutions provided with portions arranged in spaced concentric relation and angularly extending portions connecting the concentrically arranged portions thereof, and independent clamping means detachably secured to all of said convolutions extending between the concentric portion thereof and engaging each of said concentric portions, the ends of the angularly arranged portions of the coil being also secured in said clamping means, said coil being the only support for said clamping means, and said clamping means, cooperating with the coil to provide a substantally rigid structure, the angularly arranged portions forming stress distributing sections for increasing the rigidity of the coils.

In testimony whereof I affix my signature.

FRANK JOSEPH DE LEWSKY.